Patented Feb. 5, 1935

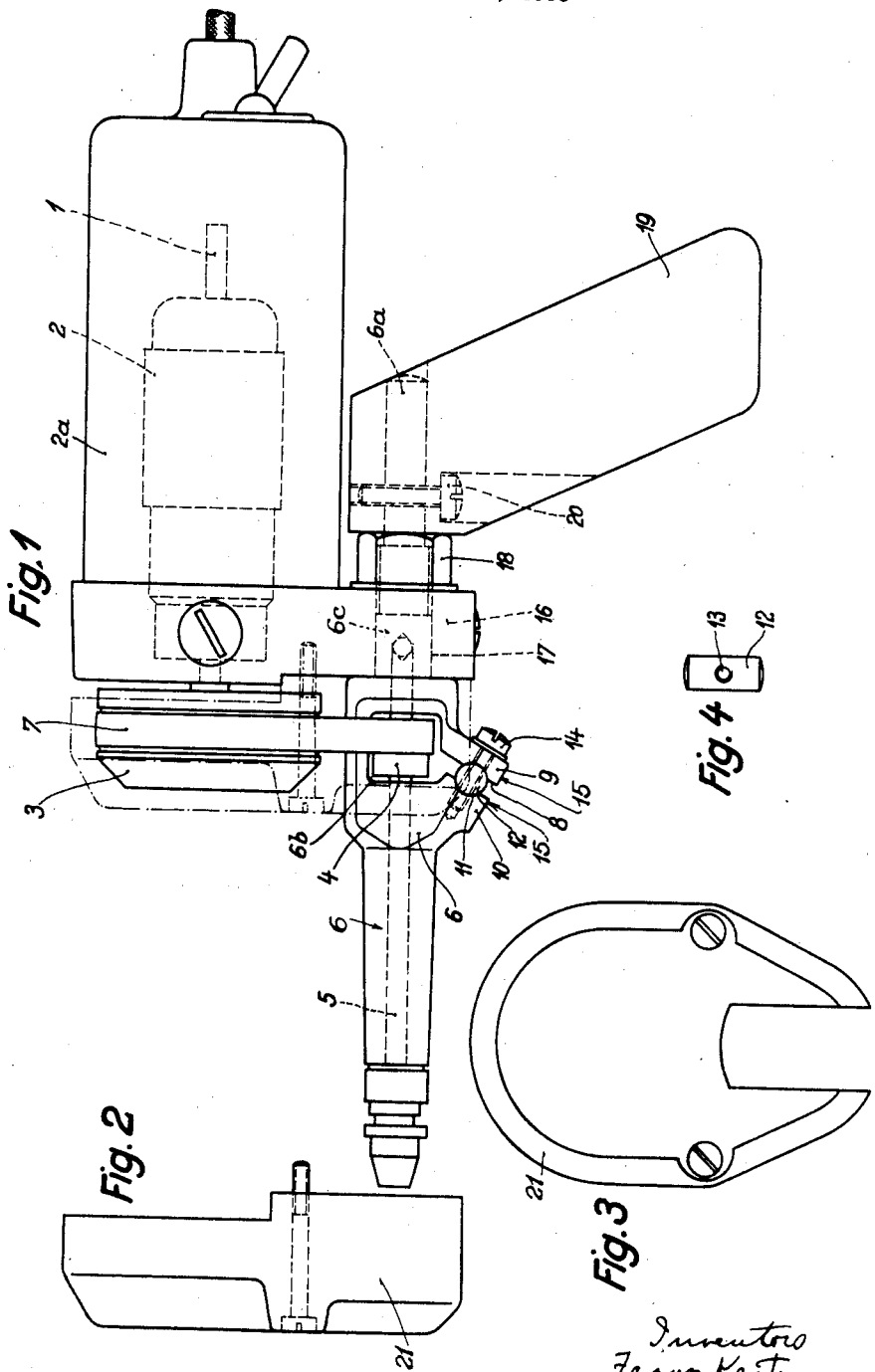

1,990,036

UNITED STATES PATENT OFFICE 1,990,036

ELECTRIC SMALL TOOL

Franz Kratz and Ernst Baumgratz, Stuttgart, Germany, assignors to Robert Bosch Aktiengesellschaft, Stuttgart, Germany Application January 3, 1933, Serial No. 650,030
In Germany January 25, 1932

5 Claims. (Cl. 74—606)

The present invention relates to electrically operated small or hand tools having a transmission gearing for the tool spindle, in which the motor, of small diameter and weight so as to be conveniently supported by the hand, has a high speed of rotation, for example, from 8,000 to 12,000 revolutions per minute, and is geared to the tool spindle by a belt drive in such a manner that the tool spindle has a speed much greater (e. g. four or five times) than that of the motor.

When a belt drive is employed in such tools, the spindle pulley is most advisably arranged between two spindle bearings, and the spindle-bearing bracket must therefore be provided with a recess to accommodate the pulley and with an opening through one side of the bracket to the recess for the insertion of the belt into the recess and the setting of the belt on the pulley. The spindle-bearing bracket thus represents to a certain extent a frame open at one side.

At speeds of 30,000–50,000 revolutions and over, the spindle-bearing bracket, owing to the opening therethrough for the insertion and setting of the belt, does not possess sufficient stiffness and may in these circumstances bend and thereby cause oscillations of the tool spindle which prevent accurate working.

According to the present invention, the recess in the spindle-bearing bracket freely opens through opposite faces of the bracket to allow for the insertion of the spindle pulley and for the run of the belt from that pulley to the driving pulley on the motor shaft, and the bearing bracket is otherwise closed with the exception of a small slit through one side serving for the introduction of the belt into the recess, and this slit is closed by a removable intermediate element which insures the mutual position of the two parts of the bracket separated by the slit.

Thus, the bracket, with the intermediate or closure element in place, forms a closed frame about the spindle pulley, and by this arrangement bending or distortion of the bearing bracket or the spindle is rendered impossible and thereby accurate running of the tool spindle is ensured.

An example of construction of the invention is illustrated in the accompanying drawing, in which Fig. 1 shows an elevation of an electrically operated grinding tool, with the front protecting cover shown only in dotted lines so as to display the parts within the cover;

Fig. 2 presents a side elevational view of the cover detached from the tool;

Fig. 3 presents a front elevational view of the cover shown in Fig. 2; and

Fig. 4 presents a side elevational view of a removable member of the framework of the spindle-bearing bracket of the tool.

In the illustrated embodiment of the invention, the driving pulley 3 is mounted overhung on the shaft 1 of an electric motor 2 (shown in broken lines). The motor casing 2a is provided with a head having a laterally projecting portion or lug 16, bored as indicated at 17, and the spindle bearing bracket 6 is provided with an intermediate cylindrical portion 6c disposed within the bore 17 when the parts are assembled, a screw threaded portion engaged by the nut 18 for movably securing the bracket in place, and a rearwardly extending end portion 6a upon which the handle 19 of the tool is mounted by the screw 20. The tool spindle 5 is journaled in suitable bearings, not shown, in the bracket 6 and extends through the hollow front part of the bracket to its operating head. The portion of the bracket 6 immediately in front of the lug 16 is of enlarged and frame-like construction to provide a recess 6b opening outwardly through two opposite faces of the bracket for the insertion into and accommodation within the recess of a spindle pulley 4 and to allow for the run of the belt 7 from the spindle pulley 4 to the motor or driving pulley 3.

In setting the belt upon the driving pulley 3 and the spindle pulley 4, one loop-end portion of the belt must, of course, be inserted in the opening 6b of the spindle-bearing bracket. To enable this to be done, and yet provide a rigid closed framework about the spindle and its pulley in the working assembly of the parts, the portion of the bracket providing the opening or recess 6b is constructed in the form of a drop frame with a projection 15 extending from one side of the frame, or from the bottom as the parts are viewed in Fig. 1. In the manufacture of the bracket, this drop frame is first made complete, that is, with the lug or projection 15 entirely solid without the slit therethrough which appears in Fig. 1 and therefore with the drop frame entirely closed about the opening or recess 6b in the vertical longitudinal median plane of the tool. Then, the original complete or intact bearing-bracket frame has its lug portion 15 drilled and sawn through so as to form a slit 8 through the lug to the opening or recess 6b and semi-cylindrical recesses 11 in the opposed side walls of the spaced parts of the lug. A cylindrical pin 12, provided with a diametrical aperture or bore 13 is designed to fit into the opposed recesses 11 so as to completely close the slit 8, the pin 12 being secured in position by a screw pin 14 extending through a drilling in the lug 15 and the aperture 13 in the pin 12, the screw pin 14 being screwed home in the drilled and threaded hole in the part of the lug remote from the head of the pin, as shown in Fig. 1.

With the spindle-bearing bracket thus formed and the parts of the tool assembled as shown in Fig. 1, but with the protecting cover or cap 21, the pin 12 and the belt 7 not yet in place, the tool is made ready for use by advancing the belt over the front end of the spindle-bearing bracket and then inserting one loop end of the belt edgewise through the slit 8 into the opening or recess 6b of the bracket, after which the belt can readily be manipulated to set it on the spindle pulley 4 and the motor or driving pulley 3. The cylindrical closure pin 12 is then inserted in the slit in the position shown in Fig. 1 and the end parts 9 and 10 of the frame formed by the slotting are then clamped by the screw pin 14 against the transverse pin 12, and thus displacement of those parts in the line of the axis of the screw pin 14 or transversely in the line of the axis of the pin 12 is rendered impossible. Therefore, the walls about the bracket opening or recess 6b now form a closed rigid frame, so that bending and distortion of the working spindle can no longer occur and oscillations heretofore possible in tools of this type employing a belt drive are prevented. Heating of the bearings is in this manner also considerably diminished.

We declare that what we claim is:—

1. A high-speed electrically-driven hand tool comprising a high speed electric motor having a shaft and a belt pulley mounted thereon, a spindle-bearing bracket, a common mounting for said motor and bracket and a handle on said mounting to the rear of said bracket for manually supporting and applying said tool to the work, said bracket having a frame portion forming an opening through said bracket between opposite faces thereof in alignment with said pulley on said motor shaft, a tool spindle journaled in said bracket for rotative movement only and extending through said opening to a fixed point in said bracket to the rear of said opening whereby said bracket takes up the rearward thrust of said spindle when the tool is applied to the work, a pulley on said spindle within said opening, said frame portion of said bracket being provided on one side thereof with a slit adapted for the insertion of one loop end of a belt for said pulleys edgewise therethrough into said opening, and means comprising a removable closure element for said slit engaging therein against the opposite boundary faces thereof for reinforcing said frame portion of said bracket in the region of said slit and preventing mutual displacement of the parts of said frame portion on opposite sides of said slit.

2. An electric tool comprising an electric motor having a shaft and a belt pulley mounted thereon, a spindle-bearing bracket and a common mounting for said bracket and motor, said bracket having a frame portion forming an opening through said bracket between opposite faces thereof, a tool spindle journaled in said bracket and extending into said opening, a pulley on said spindle within said opening, said frame portion of said bracket being provided with a slit adapted for the insertion of one loop end of a belt for said pulleys therethrough into said opening, said slit being formed with a part cylindrical recess on its two opposite faces, and a cylindrical closure element for said slit engaging in said recesses.

3. An electrical tool as defined in claim 2 and further comprising screw means for securing said cylindrical closure element in position in said slit.

4. An electric tool comprising an electric motor having a shaft and a belt pulley mounted thereon, a spindle-bearing bracket and a common mounting for said bracket and motor, said bracket having a frame portion forming an opening through said bracket between opposite faces thereof, a tool spindle journaled in said bracket and extending into said opening, a pulley on said spindle within said opening, said frame portion of said bracket being provided with a slit adapted for the insertion of one loop end of a belt for said pulleys therethrough into said opening, said slit being formed with a part cylindrical recess on its two opposite faces, a cylindrical closure element for said slit engaging in said recesses, said closure element having a diametrical aperture, and a screw pin engaging in the opposed parts of said frame portion of said bracket on opposite sides of said slit and the aperture in said closure element to rigidly connect said parts.

5. A high-speed electrically-driven hand tool comprising a casing, a high-speed electric motor mounted in said casing, a shaft extending from said motor forwardly beyond said casing and a belt pulley mounted on the forwardly extending portion of said shaft outwardly adjacent said casing, an elongated spindle-bearing bracket secured to said casing and extending forwardly therefrom in parallelism with said motor shaft to a termination forwardly of said pulley, said bracket having a frame portion forwardly adjacent its point of securement to said casing forming an opening through said bracket between opposite faces thereof in alinement with said pulley on said motor shaft, a tool spindle journaled in said bracket and extending from the forward end thereof into said opening, a pulley on said spindle within said opening, said frame portion of said bracket being provided with a slit adapted for the insertion of one loop end of a belt for said pulleys therethrough into said opening, and means comprising a removable closure element for said slit engaging therein against the opposite boundary faces thereof for reinforcing said frame portions of said bracket in the regions of said slit and preventing mutual displacement of the parts of said frame portion on opposite sides of said slit.

FRANZ KRATZ.
ERNST BAUMGRATZ.